United States Patent Office 3,845,116
Patented Oct. 29, 1974

3,845,116
USE OF ANHYDRIDES TO IMPROVE OXIDATIVE COUPLING REACTIONS
Herman L. Finkbeiner, Rexford, and John B. Bush, Jr., Schenectady, N.Y., assignors to General Electric Company
No Drawing. Continuation-in-part of application Ser. No. 814,157, Apr. 7, 1969, which is a continuation-in-part of application Ser. No. 742,544, July 5, 1968, both now abandoned. This application July 24, 1972, Ser. No. 274,670
Int. Cl. C07c 63/52
U.S. Cl. 260—515 R
8 Claims

ABSTRACT OF THE DISCLOSURE

In oxidative coupling reactions wherein an alkanoic acid, having at least two carbon atoms and at least one hydrogen on the α-carbon atom, is used as both a reactant and solvent and a manganic salt of an alkanoic acid as defined above is used as the oxidative coupling agent to couple the alkanoic acid to itself to form succinic acids to to arenes or haloarenes to form α-arylalkanoic acids or, where the acid is acetic or propionic acid, to alkanes to form esters, it has been found that the inclusion of the anhydride of said acid in the reaction mixture improves the effectiveness of the coupling reaction thereby significantly decreasing the reaction time, and in certain reactions, also improving the yield.

---

This application is a continuation-in-part of our copending, but later abandoned application Ser. No. 814,157, filed Apr. 7, 1969, which in turn is a continuation-in-part of our now abandoned application, Ser. No. 742,544 filed July 5, 1968, both of which are assigned to the same assignee as the present invention.

This invention relates to an improvement in the oxidative coupling reactions, wherein an alkanoic acid, having at least two carbon atoms and one hydrogen on the α-carbon atom, is used both as a reactant and solvent and a manganic salt of alkanoic acid, as defined above, is used as the oxidative coupling agent to couple the alkanoic acid to itself to form succinic acids to arenes or haloarenes to form α-arylalkanoic acids or, where the acid is acetic or propionic acid, to alkanes to form esters, by including in the reaction mixture the anhydride of the said acid.

Manganic salts, i.e., those in which the manganese is present in the +3 valence state, have been known for a long time. Generally, these salts have been used as oxidizing agents. More recently, it has been found that these manganic salts can cause an oxidative coupling reaction between various organic substrates and various alkanoic acids or in coupling alkanoic acids to themselves. For example, Kooyman and his students have studied and reported various reactions of manganic salts in: Trav. Chem. Pays Bas, 80, 57 and 1257 (1961) J. Catalysis, 6, 357 (1966), 10, 52 (1968) and Dewar and his students have reported their results in: J. Am. Chem. Soc., 88, 5473, 5479 and 5483 (1966). In these reactions, alkanoic acids having at least two carbon atoms and a hydrogen on the α-carbon atom have been oxidatively coupled to themselves through their α-carbon atoms to form succinic acids for example, acetic acid and propionic acid have been oxidatively coupled to themselves to form respectively, succinic acid and propionic acid to 1,2-dimethyl succinic acid. Aryl hydrocarbons also have been coupled to these alkanoic acids to produce a wide variety of products for example, α-aromatic substituted alkanoic acids and α-aromatic substituted alkyl alkanoates and dialkanoates, etc. Typical of these reactions, is the oxidative coupling of benzene with acetic acid to produce a mixture of phenyl acetic acid, benzyl acetate and benzylidene diacetate. Hydrolysis of the latter compound during work up can lead to benzaldehyde being found in the reaction mixture. Other aromatic compounds which have been coupled to alkanoic acids include toluene, chlorobenzene, anisole, veratrole, diethers of dihydric phenols, for example, dimethyl ethers of resorcinol and hydroquinone, 1- and 2-methoxynaphthalene, p-methoxy toluene, etc.

In our U.S. Pat. 3,535,372 and in our copending application, Ser. No. 274,671, filed concurrently herewith as a continuation-in-part of our copending, but later abandoned application Ser. No. 814,158, filed Apr. 7, 1969 as a continuation-in-part of our then copending, but now abandoned application, Ser. No. 742,484, filed July 5, 1968, all of which are assigned to the same assignee as the present invention, we have disclosed and claimed the use of manganic salts as coupling agents to produce, in the latter, γ-lactones by oxidatively coupling an olefin with a carboxylic acid having a hydrogen on the α-carbon atom, and, in the former, the making of acetate or propionate esters by oxidatively coupling an alkane having at least three carbon atoms, at least one of said carbon atoms having at least one but not more than two hydrogen atoms with acetic acid or propionic acid.

We now have found unexpectedly that the reaction time at a given temperature is greatly reduced in all those oxidative coupling reactions which use an alkanoic acid, having at least two carbon atoms and a hydrogen on the α-carbon atom, as both a reactant and solvent and a manganic salt of an alkanoic acid, as defined above, as the oxidative coupling agent, if the anhydride of the acid used as the solvent, is present in the reaction mixture. Still more surprisingly, we have found that in this same reaction where γ-lactones are produced by oxidatively coupling olefins to an alkanoic acid and esters are produced by oxidative coupling of alkanes to acetic or propionic acid, the yield also is greatly increased. This feature as applied to the making of γ-lactones is disclosed and claimed in our copending application Ser. No. 274,671. The above references are hereby incorporated for teachings as to the various details of their respective reactions.

The exact function of the anhydride is not known since water is not formed in any of the coupling reactions and the effect of the anhydride is the same regardless of whether the manganic salt is used in its anhydrous or hydrated form. Therefore, the function of the anhydride is not merely that of a dehydrating agent or a scavenger of water. Furthermore, it is not understood why these anhydrides have no effect when the alkanoic acid is used only as the solvent and the carboxylic reactant is a α-cyano alkanoic acid or a half ester of a malonic acid, which are especially useful for making γ-lactones.

In the making of manganic salts, a manganous salt of an alkanoic acid is oxidized to the corresponding manganic salt by the use of potassium permanganate generally using the alkanoic acid whose anion is present as the anion in the manganese salt as a solvent. However, by using a different alkanoic acid as a solvent, it is possible to produce a manganic salt whose anion is predominately that of the alkanoic acid used as a solvent, because of the mass action effect of the solvent. However, this procedure is not necessary, since the oxidative coupling reactions of this invention are carried out in an alkanoic acid solvent to attain the same result. No matter what manganic alkanoate is added to the reaction mixture, the manganic salt will be predominately in the form of the alkanoic acid used as a solvent, again because of its mass action effect.

The general method is to produce either manganic acetate or manganic propionate with manganic acetate being the usual form since the acetate salt is more readily available. When used in the oxidative coupling reactions, the manganic acetate will then form the manganic salt of the alkanoic acid used as a solvent, because the latter is present in a considerable molar excess compared to the moles of the manganic acetate added.

The manganic salts of carboxylic acids generally contain water of crystallization. Both the hydrated and anhydrous manganic salts have been used as oxidative coupling reactions, but none of the publications or the results reported therein, indicate that there is any advantage in using one or the other form of the salt. Our own work confirms this conclusion. Since the anhydrous salt is more difficult and time consuming to prepare, we prefer, in view of these results to use the hydrated form of the salt.

Regardless of whether we use a manganic salt in its anhydrous or hydrated form, the use of an anhydride in the oxidative coupling reaction mixture produces the above-mentioned advantages. The only difference is in the amount of the anhydride needed. If an anhydrous manganic salt is used, then even very small amounts of the anhydride in the order of 0.01 mole per mole of the manganic salt will be beneficial. Increasing the amount of anhydride still further improves the reaction rate up to an amount in the order of 0.1 mole per mole of the manganic salt. Higher amounts can be used, if desired, without deleterious effect. In fact, in the following reactions an increase in the amount of anhydride is desirable.

In the oxidative coupling of aromatic hydrocarbons to an alkanoic acid with the manganic salt there is a decided benefit in further increasing the amount of the anhydride. In this reaction the initial product of the reaction is the α-aryl substituted alkanoic acid which is then further oxidatively coupled to more of the alkanoic acid to produce the ester which is then further oxidatively coupled to produce the diester which on work-up of the reaction mixture leads to hydrolysis to the aldehyde. This means that not only is the reaction product a mixture of products which must be separated, but also that the yield of the initial product, which is the most desired is greatly decreased. For example, when benzene is oxidatively coupled to acetic acid with manganic acetate the products are phenylacetic acid (the most desired product) benzyl acetate, benzylidene diacetate which partially hydrolyses during work-up to produce benzaldehyde.

We have discovered that as the ratio of alkanoic anhydride to alkanoic acid is increased in this reaction that in addition to the benefits previously described, the proportion of the aryl substituted alkanoic acid in the reaction mixture is also increased in direct relation to the increased ratio. When the ratio is increased so that the molar amount of anhydride present in the solution is greater than the amount of acid, then the aryl-alkanoic acid becomes the principal product and is produced in high yields. In fact, benefits are to be gained up to the point where the anhydride is being used as the solvent for the other reactants. Apparently, this added benefit in this reaction is due to the anhydride forming a mixed anhydride with the aryl substituted alkanoic acid product, and this mixed anhydride is not further oxidatively coupled or at least such further coupling is greatly suppressed.

In the production of γ-lactones and esters, the use of the anhydride will increase the yield as well as decrease the reaction time. In these cases, the increase in yield is directly proportional to the amount of anhydride added, even after a minimum reaction time has been attained, i.e., the more anhydride used, the greater the yield of γ-lactone or ester even where the moles of anhydride exceed the moles of manganic salt present. For these reactions, amounts as high as five moles of anhydride per mole of manganic salt are beneficial. Higher amounts can be used, if desired without deleterious effect and to insure maximum yield.

If the hydrated manganic salt is added, then, in order for any anhydride to be present to gain the desired effects, the amount added should be the above amounts plus that amount required to react with water of hydration in the manganic salt. For example, in the case of manganic acetate, which crystallizes as the dihydrate, two moles of acetic anhydride are required for each mole of manganic acetate dihydrate used. Generally, since the anhydrides of the carboxylic acids are readily available or easily made and are low cost, amounts in the range of from 0.1 mole to 5 moles or more of the anhydride per mole of the anhydrous manganic salt are used. As mentioned above, the anhydride can even be used in such large amounts that it is the solvent for the reaction mixture. Less than 0.1 mole can be used, but the benefits of using larger amounts will not be attained.

From what has been said above, it is clear that when the oxidative coupling reaction is carried out, for example, using butyric acid as the alkanoic acid being oxidatively coupled, manganic acetate can be used, but will be predominately in the form of manganic butyrate because of the large excess of butyrate groups present. The proper anhydride in this case, will be butyric anhydride, i.e., the anhydride that is used in our invention is the anhydride of the alkanoic acid that is used as the reactant. These anhydrides are readily made by reacting the corresponding alkanoic acid with acetic anhydride, reaction of the alkanoic acid with its acyl halide or any of the other processes known to the art for making anhydrides from the corresponding carboxylic acid. Although an anhydride of an alkanoic acid other than the one used as the solvent can be used, interaction of the anhydride with the acid would result in both acids being present in the reaction mixture and, therefore, the production of products from both acids. This technique can be used if a mixture of both products is desired, but generally, this is undesirable.

The alkanoic acids that can be used in the oxidative coupling reactions may be any of the known alkanoic acids having at least two carbon atoms and at least one hydrogen on the α-carbon atom. They can be straight, chain, branched chain, or cyclic. Typical examples of such acids are: acetic acid, propionic acid, n-butyric acid, iso-butyric acid, pentanoic acid, cyclopentane carboxylic acid, 2-methylbutyric acid, 3-ethylpentanoic acid, the various hexanoic acids, octanoic acids, decanoic acids, hexadecanoic acids, eicosanoic acids, triacontanoic acids, etc. Since all the known alkanoic acids have melting points below 100° C., they can easily be used as both the reactant and solvent in the various oxidative coupling reactions. The various anhydrides used will be the various anhydrides of the above acids.

It will be readily appreciated by those skilled in the art that side reactions are possible which use up some of the manganic salt. These side reactions will reduce the overall yield of the desired products by producing unwanted by-products or producing substituents on some of the desired product. There also can be oxidizable impurities in the reactants used. For example, as the length of the alkyl moiety of the alkanoic acid increases in the reaction where alkanoic acids are coupled to themselves, the products will be a more complex mixture of products. The same is true of the alkanes which are coupled to acetic or propionic acids to form esters. When alkyl benzenes are used as the benzoid arylene in the reaction with an alkanoic acid to form alkarylalkanoic acids, as the number of carbon atoms in the alkyl side chain increases, the possibility increases for the alkyl substituents to act as an alkane and coupled with the alkanoic acid, especially if it is acetic or propionic acid to form esters on the alkyl side chain.

The possibility that these side reactions will occur and to what degree is dependant on the kinetics of the various possible reactions. We have never detected any dicarboxylic acid from coupling of the monocarboxylic acid to itself in any of those reactions where a carboxylic acid is coupled to another reactant, except to some extent when propionic acid is coupled to an alkane to form the propionate ester. Apparently all of these other reactants are more reactive with the carboxylic acid than the latter is with itself. Because the possibility of the above side reactions increases as the number of carbon atoms increases, because the lower homologues are more readily available we prefer that the alkanes, the alkyl substituents on the benzene ring of the benzenoid, the carboxylic acids and the anhydrides be those having no more than eight carbon atoms. Where mixed products are obtained they can be separated by well known techniques, e.g., distillation, chromatography, etc. However, where the products are used as solvents, as in the case of esters, the mixed products are often better than the individual components.

The oxidative coupling reactions are generally carried out at the lowest temperature possible commensurate with reasonable reaction times in order to minimize byproduct formation. Generally, temperatures up to the reflux temperature of the reaction mixture are used. Because of the effect of the anhydride on the reaction time at any given temperature, if desired, the anhydrides can be used to lower the reaction temperature. However, to gain the greatest reduction in reaction time, the combined effect of temperature and anhydride is utilized.

In order that those skilled in the art may better understand our invention, the following examples are given by way of illustration and not by way of limitation. In all of the examples, parts and percentages are by weight unless otherwise stated and temperatures are given in degrees centigrade.

The use of anhydrides of alkanoic acids in the reaction mixture with manganic salts of alkanoic acids will be of benefit no matter how the manganic salt is made. Various procedures have been disclosed in the art, but we have found, when the minimum reaction times and optimum yields of the products of coupling reactions are desired, that the following method is preferred since it gives a more reactive form of the manganic salt.

EXAMPLE 1

A mixture of 500 ml. of acetic acid, 48 g. of manganous acetate tetrahydrate and 85 g. of acetic anhydride (slight excess over that required to react with the water of hydration in the manganous acetate) was heated to reflux for 20 minutes. To this solution, 8 g. of potassium permanganate was slowly added, after which, refluxing was continued for 30 minutes. The reaction mixture was cooled to room temperature and 85 ml. of water added. After standing 16 hours, the manganic acetic dihydrate had crystallized from solution and was separated by filtration, washed with cold acetic acid and permitted to air-dry. This procedure also can be used to prepare manganic salts of the other carboxylic acids.

The manganic salts analyze between 90 and 95% pure and need no further purification. In the following examples, the actual amount of manganic acetate used is that based on 100% pure manganic salt, adjustments having been made on each case based on analysis for the particular batch used. The yields reported in the examples are based on the amount of manganic salt used since the other reactants are used in excess.

The general procedure in the following examples was to prepare a slurry of the manganic salt in the carboxylic acid and the anhydride and add the other reactant to be coupled. The reaction mixture was heated at reflux until the color of the manganic salt was discharged. After cooling to room temperature, the reaction mixture was poured into a large excess of water and the product extracted with benzene. The benzene extract was repeatedly washed with water to remove the carboxylic acid. The benzene solution containing the reaction products was separated into the major components in a vapor phase chromatograph. Those materials comprising major peaks were trapped and low resolution mass spectra obtained on a General Electric Monopole 600 Mass Spectrometer. Where necessary, in order to complete the identification of the products, infrared and/or nuclear magnetic resonance spectra were taken of the trapped samples or the whole reaction mixture.

EXAMPLE 2

Using the general procedure, but reacting the benzene solution prior to injection into the vapor phase chromatograph with bis-trimethylsilylacetamide to produce the trimethyl silyl ester of the acidic products, 3 g. of phenylacetic acid was added to a slurry of 3 g. of manganic acetate dihydrate in 20 ml. of acetic acid and 1 ml. of acetic anhydride. This reaction required only 20 minutes producing a 49% yield of benzylacetate. In the absence of acetic anhydride, it required a period of from 1 to 3 hours to produce the same yield. When this example is repeated using 3 g. of p-methylphenylacetic acid in place of the phenylacetic acid, the reaction is over in less than 20 minutes producing a 77% yield of p-methylbenzyl acetate. Likewise, when o-chlorophenyl acetic acid is used in place of the phenylacetic acid, the reaction is over in 20 minutes producing a mixture of o-chlorobenzyl acetate and o-chlorobenzylidene diacetate, compared to a reaction time of 2 hours in the absence of the anhydride.

EXAMPLE 3

Using the general procedure, 1 ml. of benzene, p-xylene and p-dichlorobenzene were separately added to slurries of 2 g. of manganic acetate dihydrate and 20 ml. of acetic acid and 5 ml. of acetic anhydride. The reaction was also repeated using 25 ml. of acetic acid without any anhydride. With benzene, the effect of the anhydride was to reduce the reaction time from 18 hours to 75 minutes, with the yields and products being essentially the same, i.e., 48% benzaldehyde, 4% benzylidene diacetate, 26% benzyl acetate and 19% phenylacetic acid. With p-xylene, the effect of the anhydride was to reduce the reaction time to 1 hour with the main product being p-methylbenzyl acetate (13%) and 2,5-dimethylbenzyl acetate (61%). With p-dichlorobenzene, the effect of the anhydride was to reduce the reaction time to 1 hour with the main products being 2,5-dichlorobenzylidene diacetate (6%) and 2,5-dichlorophenylacetic acid (58%).

EXAMPLE 4

Using the general procedure, toluene and chlorobenzene were separately reacted by adding 3 ml. of each to slurries of 5.4 g. of manganic acetate dihydrate in 20 ml. of acetic acid and 5 ml. of acetic anhydride. The reactions were also repeated in which 25 ml. of acetic acid was used without any anhydride. The effect of the anhydride with toluene was to reduce the reaction time from 17 hours to 20 minutes. The yield and composition of the products was essentially the same. The chief products being methylbenzyl acetates (69%), benzyl acetate (9%) and methylphenyl acetic acids (7%). With chlorobenzene, the effect of the anhydride was to reduce the reaction time from 21 hours to 1 hour, the main products being chlorophenylacetic acids (30%), chlorobenzyl acetates (21%) and chlorobenzylidene diacetates (18%).

The following Examples 5 and 6, illustrate how increasing the ratio of anhydride to acid gives the added benefit of increasing the yield of the aryl alkanoic acid.

EXAMPLE 5

In a series of experiments a slurry of 5.36 g. of manganic acetate dihydrate, 5 ml. of benzene and acetic acid and acetic anhydride in the ratios shown in the table were heated to reflux until the manganic acetate color had faded (approximately 1 hour). Water, 40 ml., was added and refluxing continued for an additional 2 hours to hydrolyze any anhydrides present. The yield of phenylacetic acid obtained was directly proportional to the fraction of acetic anhydride present in the reaction mixture.

| Run number | Acetic acid, ml. | Acetic anhydride, ml. | Phenylacetic acid, percent |
| --- | --- | --- | --- |
| 1 | 35 | 5 | 9.7 |
| 2 | 20 | 20 | 29.5 |
| 3 | 5 | 35 | 37.0 |

Similar results are obtained when equivalent amounts of other acids and their corresponding anhydrides, for example, isobutyric acid, isobutyric anhydride, 2-ethylhexanoic acid, 2 ethylhexanoic anhydride are used in the above example in place of the acetic acid and acetic anhydrides.

EXAMPLE 6

The above example was repeated except the benzene was replaced with 3.0 g. of 1,3,5-trichlorobenzene.

| Run number | Acetic acid ml. | Acetic anhydride, ml. | 2,4,6-trichlorophenylacetic acid, percent |
| --- | --- | --- | --- |
| 1 | 35 | 5 | 11.2 |
| 2 | 20 | 20 | 24.9 |
| 3 | 5 | 35 | 47.5 |

EXAMPLE 7

Using the general procedure, acetic acid was oxidatively coupled to itself to produce succinic acid by reacting 20 ml. of acetic acid in the presence of 2 g. of manganic acetate dihydrate and 2.5 ml. of acetic anhydride. The reaction required 2 hours and 15 minutes producing a 5% yield of succinic acid. In order to isolate the succinic acid from the reaction mixture, it was found highly desirable to add methanolic HCl to the reaction mixture to esterify the succinic acid. In the absence of acetic anhydride, the same reaction requires 20 hours. Repeating this example with propionic acid produces a mixture of 2,3-dimethyl succinic acid, dimethylmaleic acid, dimethylfumaric acid and 2-methyl-3-methylenesuccinic acid, all isolated as their methyl esters with essentially the same reduction in time being obtained by the use of propionic anhydride.

EXAMPLE 8

To a slurry of 5.4 g. of manganic acetate dihydrate in 20 ml. of propionic acid and 10 ml. of propionic anhydride, 3 ml. of cyclooctane was added. This reaction mixture was heated at reflux requiring only 27 minutes for the color of the manganic ion to be discharged. The reaction mixture was poured into excess of water and the aqueous layer extracted with ether. After drying the ether layer and evaporation of ether, the residue was injected into a vapor phase chromatograph and the main product trapped yielding a 9% yield of cyclooctylpropionate. When the reaction was repeated replacing the 10 ml. of propionic anhydride with 10 ml. of propionic acid, the reaction required 18 hours at reflux for completion and the yield was reduced to 2%.

Similar reductions in time and increases in yield were obtained when acetic acid was oxidatively coupled by this method with cyclohexane to produce cyclohexyl acetate, with 2,3-dimethylbutane to produce 2,3-dimethyl-2-butyl acetate and with 2,2-dimethylbutane to produce a mixture of two butyl acetates, the major amount being the expected 3,3-dimethyl-2-butyl acetate and the minor amount being 2,3-dimethyl-2-butyl acetate due to some methyl group migration.

EXAMPLE 9

Using the general procedure, 1.36 g. of adamantane was added to a slurry of 2.68 g. manganic acetate in 20 ml. of acetic acid and 5 ml. of acetic anhydride. The color of the manganic acetate was discharged in 20 minutes. The yield of 1-adamantyl acetate was 78%. When the reaction was repeated in the absence of acetic anhydride, the color of the manganic ion had not been completely discharged in 24 hours and the yield was reduced to 26.1%. Similar results are also obtained when the acetic acid and acetic anhydride of this example are replaced with an equivalent amount of other alkanoic acid and its anhydride, for example, N-butyric acid, N-butyric anhydride or cyclohexanoic anhydride.

It is seen from the above examples that the use of an anhydride in these various oxidative coupling reactions with manganic salts of alkanoic acids, has greatly decreased the time of the reaction and also, in the case of the preparation of aryl-alkanoic acids, and esters, greatly increased the yield. The utility of this invention is obvious in carrying out these various oxidative coupling reactions. The products of these reactions are well known as chemical compounds having a wide variety of uses, for example, in organic synthesis for the preparation of other compounds. The esters are useful as solvents and plasticizers and for the making and blending of perfumes. The α-aryl-alkanoic acids can be used to make esters useful as above. They also have bacterial, fungicidal and herbicidal properties. The succinic acids are also useful in making esters useful as above or in the making of polymers with dihydric alcohols.

In light of the above teachings, it is obvious that other modifications and variations of the present invention are possible. It is therefore, to be understood that changes may be made in the particular embodiments of the invention described which are within the full intended scope of the invention as described by the appended claims.

What we claim as new and desire to secure by Letters Patent of the United States is:

1. The process whereby a $C_{2-8}$ alkanoic acid having at least a hydrogen on the α-carbon atom is coupled through the α-carbon atom to benzene or benzene having no more than five $C_{1-8}$ alkyl or halo substituents to produce the corresponding α-arylalkanoic acid using a manganic salt of the alkanoic acid as an oxidative coupling agent, said process being carried out in the presence of a sufficient amount of the anhydride of the alkanoic acid present as the reactant to provide an excess over the amount required to react with any water present in the initial reaction mixture.

2. The process of claim 1, wherein the anhydride is acetic anhydride.

3. The process of claim 1, wherein the anhydride is propionic anhydride.

4. The process of claim 1, wherein the anhydride is butyric anhydride.

5. The process of claim 1, wherein the manganic salt is the salt of $C_{2-4}$ alkanoic acid, the alkanoic acid is a $C_{2-4}$ alkanoic acid and the anhydride is the anhydride of a $C_{2-4}$ alkanoic acid.

6. The process of claim 1, wherein the manganic salt is manganic acetate, the alkanoic acid is acetic acid and the anhydride is acetic anhydride.

7. The process of claim 1, wherein the manganic salt is manganic propionate, the alkanoic acid is propionic acid and the anhydride is propionic anhydride.

8. The process of claim 1, wherein the manganic salt is manganic butyrate, the alkanoic acid is butyric acid and the anhydride is butyric anhydride.

References Cited

UNITED STATES PATENTS 3,641,120   2/1972   Broderick et al. ------ 260—491

JAMES A. PATTEN, Primary Examiner

U.S. Cl. X.R.

260—343.6, 413, 485, 488 R, 488 F, 515 A, 537, 599